(12) United States Patent
Sedgwick

(10) Patent No.: US 12,541,177 B2
(45) Date of Patent: Feb. 3, 2026

(54) SOLAR ENERGY CHARGING WATCH AND ELECTRONIC KEY DEVICE AND OPERATING SYSTEM THEREOF

(71) Applicant: Derek Jose Galindo Sedgwick, Midland (CA)

(72) Inventor: Derek Jose Galindo Sedgwick, Midland (CA)

( * ) Notice: Subject to any disclaimer, the term of this patent is extended or adjusted under 35 U.S.C. 154(b) by 167 days.

(21) Appl. No.: 17/734,872

(22) Filed: May 2, 2022

(65) Prior Publication Data

US 2023/0375981 A1    Nov. 23, 2023

(51) Int. Cl.
| | |
|---|---|
| *G04C 10/02* | (2006.01) |
| *G04G 9/00* | (2006.01) |
| *G04G 21/02* | (2010.01) |
| *G04G 21/04* | (2013.01) |
| *G04G 21/06* | (2010.01) |
| *G04G 21/08* | (2010.01) |
| *G06K 19/07* | (2006.01) |

(52) U.S. Cl.
CPC ............. *G04C 10/02* (2013.01); *G04G 9/007* (2013.01); *G04G 21/02* (2013.01); *G04G 21/04* (2013.01); *G04G 21/06* (2013.01); *G04G 21/08* (2013.01); *G06K 19/0723* (2013.01)

(58) Field of Classification Search
CPC .................................................. G04C 10/02
See application file for complete search history.

(56) References Cited

U.S. PATENT DOCUMENTS

| | | | | |
|---|---|---|---|---|
| 3,328,954 A | * | 7/1967 | Miller ................ | G04C 17/0083 368/64 |
| 4,665,397 A | * | 5/1987 | Pinnow .............. | G07C 9/00817 361/172 |
| 4,705,407 A | * | 11/1987 | Brien ..................... | G04B 19/30 368/227 |
| 5,548,565 A | * | 8/1996 | Aoyama ................ | G04B 47/00 368/227 |
| 8,169,859 B1 | * | 5/2012 | Sheehan .............. | G04B 37/144 368/76 |
| 8,565,829 B2 | * | 10/2013 | Kim ...................... | G06F 1/1616 345/173 |
| 8,773,847 B2 | * | 7/2014 | Byun .................... | H04B 1/385 368/281 |
| 9,007,195 B2 | | 4/2015 | Ghabra | |
| 9,744,943 B1 | | 8/2017 | Hiatt et al. | |

(Continued)

*Primary Examiner* — Edwin A. Leon
*Assistant Examiner* — Jason M Collins
(74) *Attorney, Agent, or Firm* — HEER LAW; Christopher D. Heer

(57) ABSTRACT

A solar energy charging watch and electronic key device and operating system thereof includes a body having a watch face, at least one digital touchscreen display on the watch face, at least one camera on the watch face, a rechargeable battery, at least one of a Bluetooth chip, a Near Field Communication (NFC) chip, and a radio frequency identification (RFID) tag. The solar energy charging watch and electronic key device and operating system thereof further includes at least one photovoltaic cell for powering the rechargeable battery, a means for storing energy from the at least one photovoltaic cell, and a means for transferring energy from the at least one photovoltaic cell to the rechargeable battery.

8 Claims, 24 Drawing Sheets

(56) References Cited

U.S. PATENT DOCUMENTS

| | | | | |
|---|---|---|---|---|
| 2008/0089182 A1* | 4/2008 | Scheybal | G04G 21/00 | 368/10 |
| 2009/0109798 A1* | 4/2009 | West | G09B 23/281 | 368/10 |
| 2009/0231960 A1* | 9/2009 | Hutcheson | G04G 21/04 | 379/430 |
| 2009/0280861 A1* | 11/2009 | Khan | H04B 1/3827 | 455/556.1 |
| 2009/0318779 A1* | 12/2009 | Tran | A61B 5/369 | 600/595 |
| 2013/0216065 A1* | 8/2013 | Nguyen | G08B 21/043 | 381/94.1 |
| 2013/0231574 A1* | 9/2013 | Tran | A61B 5/0022 | 600/509 |
| 2015/0277384 A1* | 10/2015 | Mankowski | G16H 40/67 | 368/10 |
| 2016/0161922 A1* | 6/2016 | Shin | G04G 9/06 | 368/82 |
| 2020/0367816 A1* | 11/2020 | Panneer Selvam | A61B 5/7475 | |

* cited by examiner

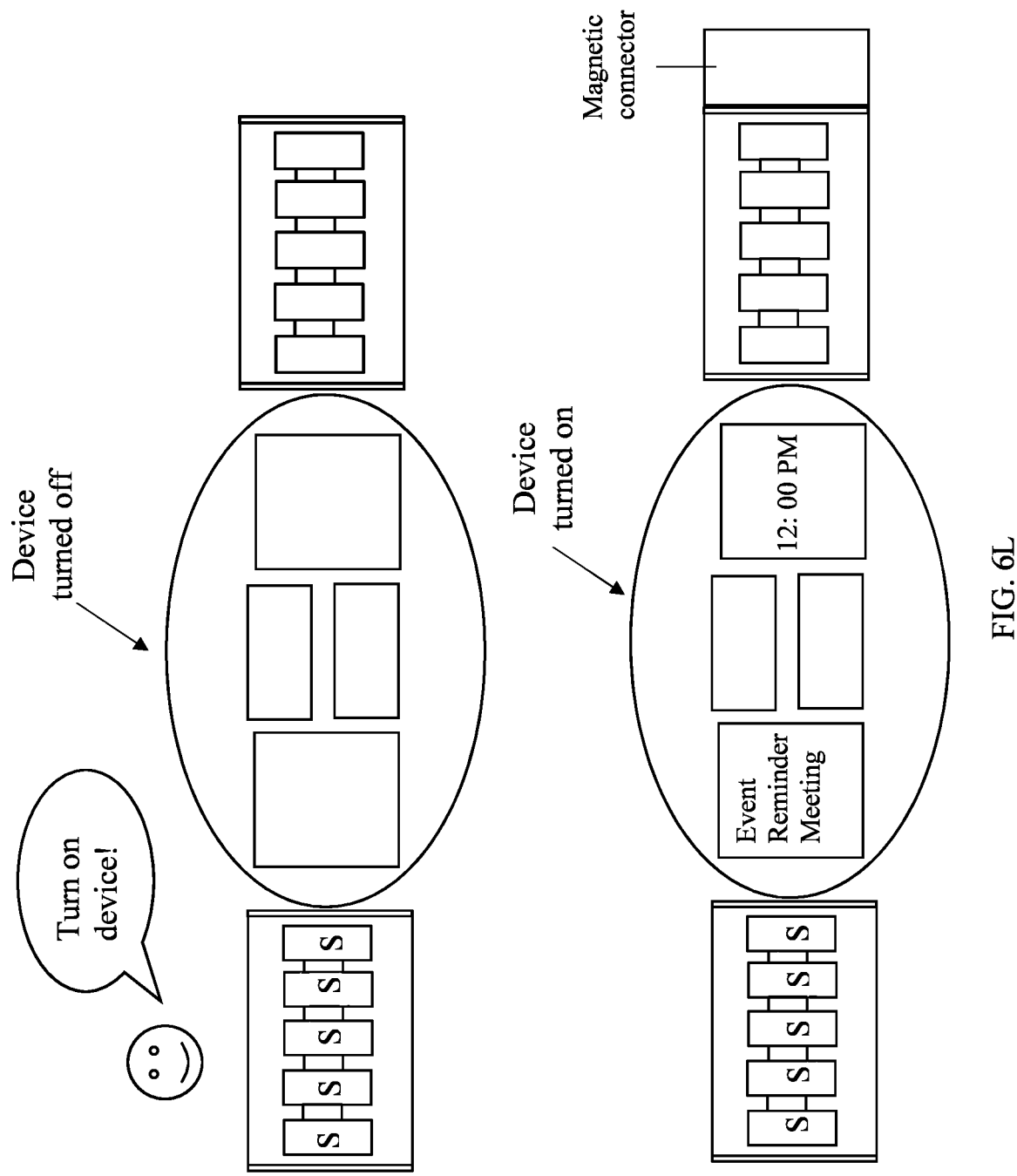

SOLAR ENERGY CHARGING WATCH AND ELECTRONIC KEY DEVICE AND OPERATING SYSTEM THEREOF

FIELD OF INVENTION

The specification generally relates to an apparatus for a charging watch and electronic key device and thereof and specifically to a solar powered and moonlight powered watch and electronic key device and operating system thereof.

BACKGROUND OF INVENTION

Consumers carry battery powered devices whose battery power depletes over the course of a day. Consumers do not always have access to a charging device or outlet to replenish their device's battery but are able to access sunlight or moonlight while out and about. By wearing one device that is powered by solar energy and moonlight energy and comprises watch functionality, key fob capabilities, personal identification, and digital capabilities, a consumer can pare down the number of devices they need to carry without worrying about draining the device's batteries.

Existing technology relates only to separate watches and key fobs where the watches cannot perform key fob functions. Existing devices do not have a sensor accessible ignition inside a vehicle, personal plane (a non-commercially owned plane), or house activated by moving a user's hand over the face of the operating systems interface, instead electing to use a keypad or digital key touch system to perform the same functionality. The current key fobs and watches are not powered by solar energy or moonlight energy.

SUMMARY OF THE INVENTION

In one aspect of the present invention there is provided a solar energy charging watch and electronic key device and operating system thereof comprising: a body comprising: a watch face; at least one digital touchscreen display on the watch face; at least one camera on the watch face; a rechargeable battery; and at least one of a Bluetooth chip, a Near Field Communication (NFC) chip, and a radio frequency identification (RFID) tag; at least one photovoltaic cell for powering the rechargeable battery; means for storing energy from the at least one photovoltaic cell; and means for transferring energy from the at least one photovoltaic cell to the rechargeable battery.

Preferably, the solar energy charging watch and electronic key device and operating system thereof further comprises a strap that is attached to the body.

Preferably, the at least one digital touchscreen display comprises two digital touchscreen displays.

Preferably, the at least one camera comprises two cameras.

Preferably, one of the two cameras comprises a wide angle lens.

Preferably, the solar energy charging watch and electronic key device and operating system thereof further comprise at least one secondary digital display on the watch face.

Preferably, the at least one secondary digital display on the watch face comprises two secondary digital displays on the watch face.

Preferably, the at least one photovoltaic cell is attached to the strap of the device.

Preferably, the at least one photovoltaic cell comprises a plurality of photovoltaic cells.

Preferably, the body further comprises a payment processing chip.

Preferably, the solar energy charging watch and electronic key device further comprises a flashlight unit.

Preferably, the solar energy charging watch and electronic key device and operating system thereof further comprises a microphone and voice processing means for receiving voice commands.

Preferably, the body has a three dimensional shape of an animal.

Preferably, the body further comprises a SIM card port for at least one of nano, micro, and standard sized SIM cards.

Preferably, the means for transferring energy from the at least one photovoltaic cell to the rechargeable battery comprises a transistor and the means for storing energy from the at least one photovoltaic cell comprises a capacitor.

Other aspects and features and combinations thereof concerning embodiments described herein will become apparent to those ordinarily skilled in the art upon review of the instant disclosure of embodiments in conjuration with the accompanying figures.

BRIEF DESCRIPTION OF THE DRAWINGS

The principles of the invention may be better understood with reference to the accompanying figures provided by way of illustration of an exemplary embodiment, or embodiments incorporating principles and aspects of the present invention, and in which.

DETAILED DESCRIPTION OF EMBODIMENTS OF THE INVENTION

Figure 1:
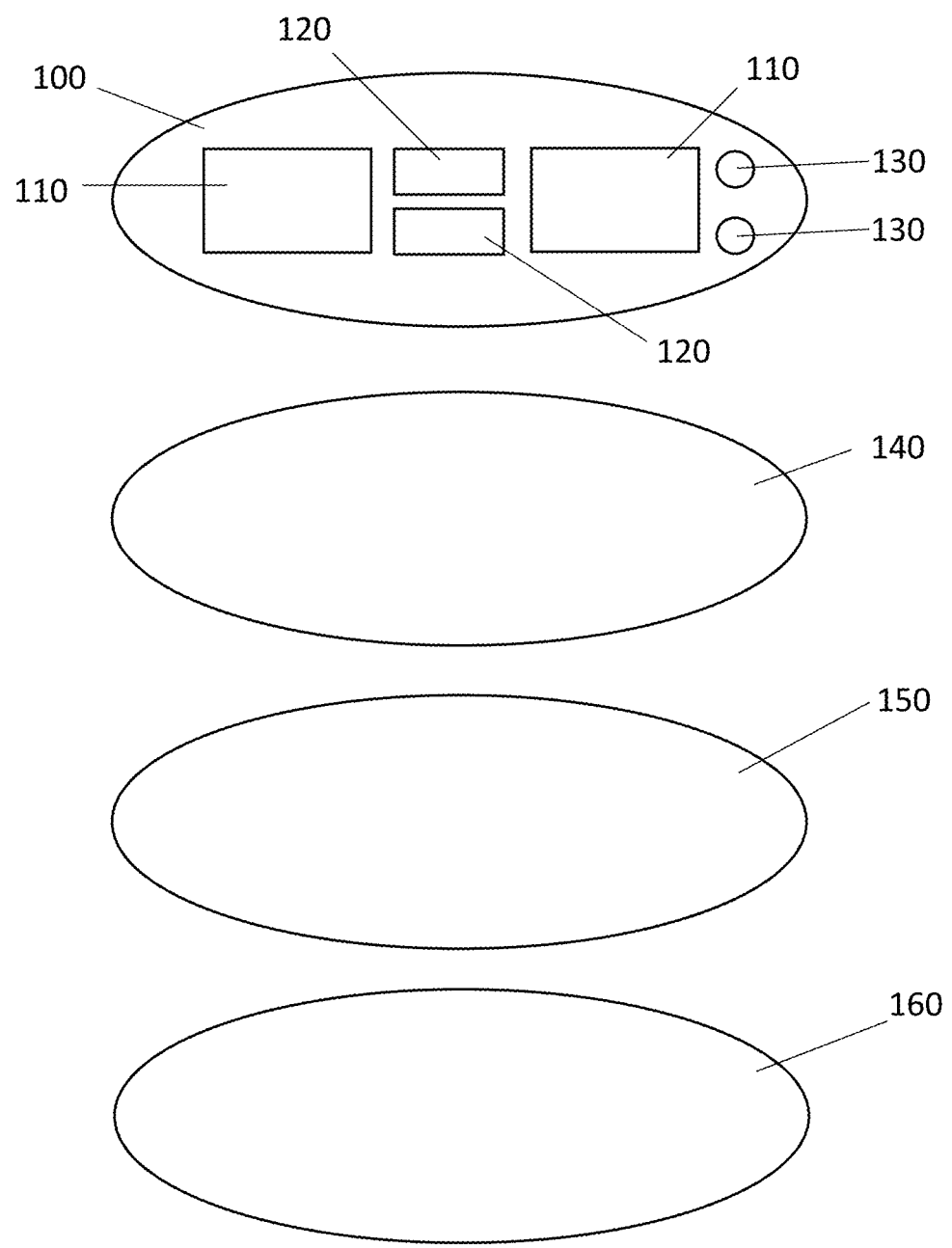
FIG. 1 is a schematic diagram of a watch face for a solar energy charging watch and electronic key device and operating system thereof, according to some embodiments.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in same instances proportions may have been exaggerated in order more clearly to depict certain features of the inventions.

According to an embodiment, the device provides a watch battery powered by miniature solar energy panels and miniature moonlight energy panels with a main wall charging unit electrical component that acts as a power optimizer connected to a power capacitor power storage to limit and store excess power in watch edges. In an embodiment, the moonlight energy conducting panels will optimize the capacitor and battery during nighttime when there is access to moonlight. The watch battery may also be powered by fluorescent energy, incandescent energy, or energy from a wall outlet, preferably through a Micro USB Type C charging cord, that is inserted into the side of the device. Preferably, the battery is a rechargeable lithium ion battery or a lithium-ion polymer battery.

According to an embodiment shown in FIG. 1, a device for a solar energy charging watch and electronic key device and operating system thereof comprises a watch face layer 100 with two digital display panels 110a and 110b on either end of the watch face layer with two smaller digital display panels 120a and 120b position between. In one embodiment, digital display panels 110a and 110b and smaller digital display panels 120 and 120b are turned on and off by voice-command. In other embodiments, the displays are turned on and off by the press of a button (not shown) or by movement of the user's wrist. Two cameras 130a and 130b are present on the right-hand side of watch face layer 100. Preferably, the camera 130a and camera 130b are different types of cameras. For example, one of camera 130a and camera 130b could be a fisheye lens or a wide-angle lens. The camera 130a and the camera 130b may be positioned at different angles so different pictures are taken from each camera when the watch face layer 100 is in the same position. Below watch face layer 100, the device comprises three further layers, namely, watch face layer 140, watch face layer 150, and watch face layer 160. Preferably, the device is manufactured using 3D printing technology or individually handmade units. Other manufacturing techniques could also be used and would be known to a person of skill in the art.

The three-dimensional shape of device for a solar energy charging watch and electronic key device and operating system thereof can vary. For example, the three-dimensional shape of device for a solar energy charging watch and electronic key device and operating system thereof could be similar to existing wrist watches. However, preferably, the three-dimensional shape of device for a solar energy charging watch and electronic key device and operating system thereof is the shape of the head of an animal. For example, a wolf, a lion, tiger, a cat, a dog, a pig, a horse, a duck, or a sheep. In said embodiments, camera 130a and camera 130b could be represented as the left eye and right eye of the head of the animal. An input microphone and out speakers could be located within a combination of the nose or mouth of the head of the animal.

Figure 2:
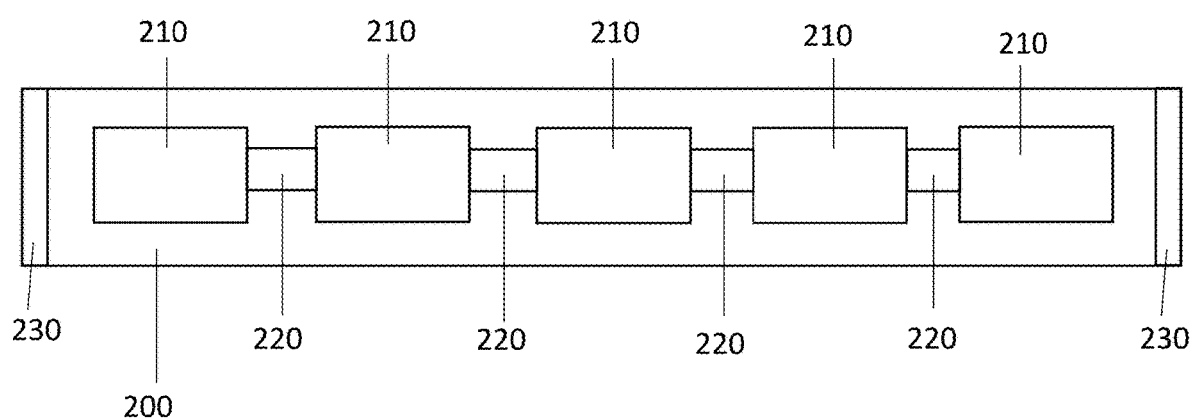
FIG. 2 is a schematic diagram of a watch strap for the device illustrated in FIG. 1, according to some embodiments.

According to an embodiment shown in FIG. 2, a device for a solar energy charging watch and electronic key device and operating system thereof includes a watch strap 200 with Velcro straps 230 on both ends of watch strap 200. Preferably, the watch strap 200 is 6 inches long and 2 inches wide, however these dimensions can be changed to accommodate the variable circumference of a user's wrist. Preferably, the watch strap 200 comprises solid, but flimsy carbon fibre, however other materials known to the person of skill in the art could be used. Although Velcro straps 230 are shown, other fastening means known to the person of skill in the art could alternatively be used. The watch strap 200 preferably contains five miniature solar panels 210 connected to each other with a magnetic strip 220 [is the strip magnetic or copper? If copper, can other materials be used alternatively?]. While five miniature solar panels 210 are shown, the number of solar panels can vary depending on the size of the watch strap 200 and the power needs of the device. Preferably, the solar panels 210 are photovoltaic cells, which convert the energy of sun light, moon light, and/or indoor lighting. Preferably, the miniature solar panels 210 have a length of 1.6 inches and a width of 1.6 inches. However, both the number of miniature solar panels 210 and the size of the miniature solar panels 210 can vary. Preferably, each miniature solar panel 210 can produce up to 2.5 W/h of energy and 2500 mAh. Therefore, five miniature solar panels 210 in combination can produce up to 12.5 W/h of energy or 12,500 mAh. The miniature solar panels 210 are shown in a line in the middle of the watch strap 200. However, other arrangements known to the person of skill in the art could alternatively be used.

Figure 3:
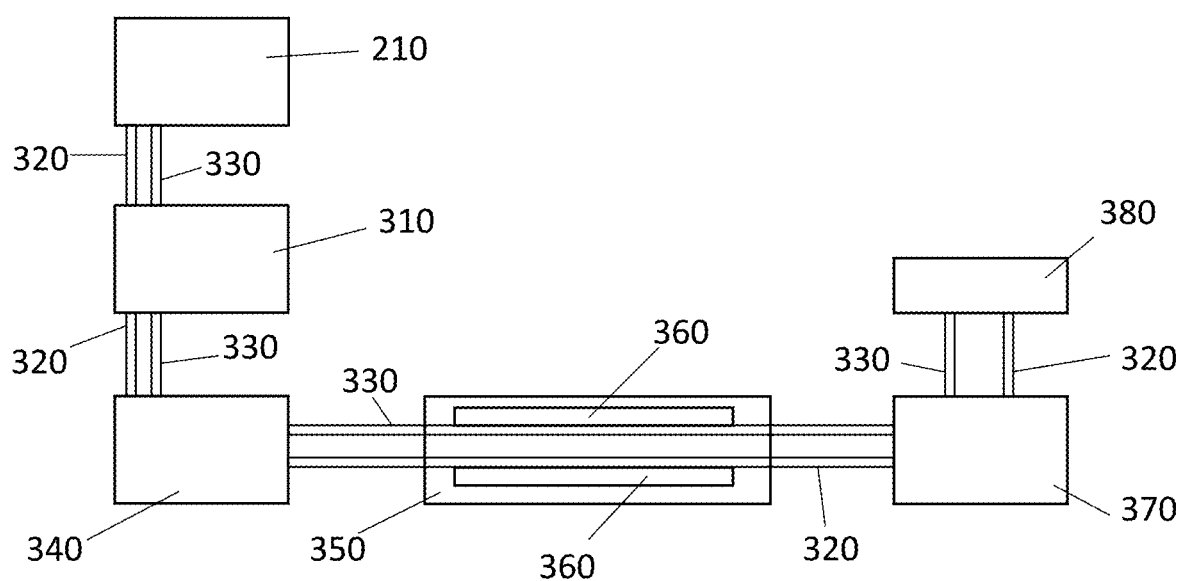
FIG. 3 is a schematic diagram of a solar panel charged battery for the device illustrated in FIGS. 1 and 2, according to some embodiments.

According to an embodiment shown in FIG. 3, a device for a solar energy charging watch and electronic key device and operating system thereof battery charging comprises a solar panel 210; a Lithium-polymer cellular battery 310; a solar charger field 340; an epoxy board 350; a Model View Controller (MCV) 370; and a battery 380. Solar panel 210 connects to cellular battery 310 with a positive line 320a and a negative line 330a. Cellular battery 310 connects to solar charger field 340 with positive line 320b and negative line 330b. Solar charger field 340 connects to MCV 370 with positive line 320c and negative line 330c going through epoxy board 350 with strip tape 360. Strip tape 360 comprises at least one magnetic material, preferably copper. MCV 370 connects to battery 380 with positive line 320 and negative line 330.

Figure 4:
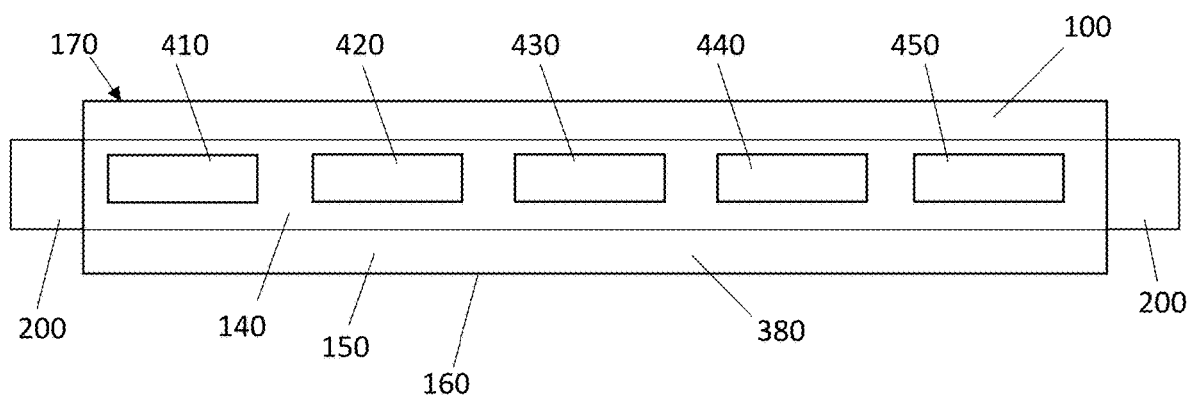
FIG. 4 is a schematic side perspective diagram of the device illustrated in FIG. 1, according to some embodiments.

According to an embodiment shown in FIG. 4, a device for a solar energy charging watch and electronic key device and operating system thereof includes a watch face 170 with four watch face layers 100, 140, 150, and 160. Watch face layer 100 acts as the top face of watch face 170. Watch face layer 140 is below watch face layer 100 and includes a SIM card slot 410 for nano, micro, and standard SIM cards; a battery cell storage capacitor 420 for miniature solar panels (not shown); an electronic key fob electronic control unit panel 430; a remote-control electronic control unit panel 440 to enable key fob remote control functionality; and a New Field Communication, Bluetooth, 4G, and 5G network chip 450 for long range connectivity in watch layer 140. Underneath watch layer 140, battery 380 is contained in watch layer 150. Watch layer 160 acts as the bottom face of watch face 170. Watch strap 200 connects to watch face 170 on the left and right-hand sides.

According to a further embodiment, the device comprises functionality to remote control drive a vehicle; lock and unlock a vehicle, building, door to a house or community living access door, a garage, or gate; control a home or business security system; control lighting in a home or business. In an embodiment, the device comprises key fob functionality for powering on and off devices and transportation vehicles by passing the device over a sensor ignition or power assisted door. Preferably, the device communicates with transportation vehicles by using near field communication (NFC) or Bluetooth technology. Other similar technologies, known to a person of ordinary skill in the art, could be used. Alternatively, the device could communicate with transportation vehicles using voice-activated commands.

According to a further embodiment, the device comprises remote-control functionality for vehicle parking assistance. In an embodiment, the device comprises functionality for remote control for vehicles, aquatic vessels, and all other types of transportation engines; an Engine Management System for the electronic controls of any transportation vehicle; and an Electronic Control Unit for controlling all electrical components of any mode of transportation including vehicles.

According to an embodiment, the device comprises personal identification information including a digital drivers license; a digital passport; and a digital health card. In an embodiment, the device comprises payment processing functionality including user integration for banking information and card information to their vehicle for vehicle or curbside payment at local bank branches to wire funds or make payments from inside a vehicle.

According to an embodiment, the device includes functionality to send and receive peer to peer and customer to terminal payment processed transaction through Bluetooth and Near Field Communication connections and by fourth and fifth generation connectivity without need for a secondary or external controlled device. In an embodiment, the device includes functionality to send and receive text message communications and cellular call communications through cellular data or wireless network communications. Cellular call communications may be between two individuals or between a group of people, for example in a conference call.

According to an embodiment, the device comprises a sunlight tracking system to provide readings and notifications to the device to provide information on the position of the sun. This information can be used by a user to change the orientation of the device to optimize solar charging. In an embodiment, the device includes vehicle notification functionality for engine readings including gas mileage; fuel level percentage; tire sensor levels; and inner tire air volume measurements. Notifications will also be made for locating vehicle parking lots, theft detection, or potential break in activity.

According to an embodiment, the device comprises voice assisted automated driving functionality that integrates with a user's vehicle. In an embodiment, the device comprises voice command functionality to allow a user to change their music or use remote start for a vehicle. Voice assistance functionality is provided to allow for voice assisted self driving power on and off functionality.

According to a further embodiment, the device comprises functionality to change the exhaust flow valve on the tip of the exhaust pipe to assist with noise levels of the exhaust and exhaust air flow. In an embodiment, the device includes functionality for a user to control the amount of energy stored to enter an electric motor in a solar powered or electric vehicle with solar panels to get the minimum or maximum output from the vehicle during daytime or nighttime to ensure equal power between the electronics of the vehicle and the power produced to operate the drivetrain.

According to an embodiment, the watch face 100 displays the time in the user's current time zone or any other time zone and includes the ability to display a calendar.

According to an embodiment, the device provides charging capabilities for another device of a similar size to the device while optimizing an external battery pack or other external charging method. Device to device charging while the embodiment is charging will not allow for a device of a larger size to be charged.

According to a further embodiment, the device includes automated syncing functionality comprising a process that uses the device's alarm clock to communicate with the device that it may automatically unlock and lock certain entry points with requiring touching the sensor at certain time periods authenticated by a password to verify a user's decision to authorize unlocking the device, entry point, payment terminal, or starting a vehicle's ignition.

According to a further embodiment, the device is used to turn on and turn off home appliances as well as set appliance start times; to turn on and turn off devices, such as electrical components comprising home security systems and lighting; to turn on and turn off vehicles (land and aquatic and amphibious), aeronautic transportation; to open and close digital entry doors for homes, digital storage safes, and vehicles (land and aquatic and amphibious), aeronautic transportation; to provide wireless transmitted control for vehicles (cars, sport utility vehicles, and trucks) exhaust valves to let the exhaust noise output louder or muffled for quieter sound; to wirelessly transmit control for vehicles (cars, sport utility vehicles, and trucks) driving electronic control unit to alter the engine horsepower or modify its engine turbo timing as well as the engine management system for higher potential vehicle output. The device can also be used as a wireless control to open and close digital property perimeter gates and home doors such as front doors, side doors, back doors, or vehicle doors, aeronautic transportation doors and aquatic- or amphibious-vehicle doors.

According to a further embodiment, EMVC (Europay, Mastercard, and Visa Chips) enables payment fields which allows the device operating system to make payments at bank automated teller machines (ATMS), point of sale terminals (POST), and portable point of sale terminals (portable POST). The near field communication chips (NFCC), as well as the payment processor chips, enable payment fields and chips and the Bluetooth communication chips (BCC) are used as a gateway allowing all identification data to be transferred from the device to operating system to devices, appliances, vehicle control units, vessel electrical data units, aquatic engine control units and electrical control interfaces for capturing and displaying human identification information as well as performing functions like unlocking and locking devices and appliances, access doors also for transportation vehicles and vessels, and to power on and power off devices, appliances, electronic ignition systems for transportation vehicles and aquatic vessels, aeronautic vessels and aeronautic transportation vehicles. RFID chips are used to prevent any external/internal payment communications from device to device or from device to payment terminal interfaces in restaurants, stores, gas stations malls, sports arenas, banks (banking) from being infiltrated by external bad communication equipment or negative interference communications to steal data or information of numbers, currency, pathways of unlocking and locking and payment utilization.

When NFC or Bluetooth technology has been activated, the devices allows a user to control electrical components such as home security and lighting, to open and close doors such as personal home and public parking garages, home doors, driveway gates, gym accessibility, all electronic locking systems for lockers at the gym, home lockers, public lockers, filing cabinets, private electronic safes, and bank safe deposit boxes by simply using a user's voice commands with. Additionally, a user can pass the device against the terminal interface whether it stands outside before the unit or on the units themselves for accessibility on the door of one's personal home or a public parking garage, driveway gates, gym accessibility, all electronic locking systems for lockers at the gym, home lockers, public lockers, filing cabinets, private electronic safes, and bank safe deposit boxes and appliances. The device can also be used to open and close all vehicles, vessels, electronic devices and accessibility units like personal home and public parking garages, home doors, driveway gates, gym accessibility, all electronic locking systems for lockers at the gym, home lockers, public lockers, filing cabinets, private electronic safes, and bank safe deposit boxes and appliances. The device can also be used to make payments from device to another user's device (called "Direct Pay Technology"), or payments to payment terminals such as bank machines, ATMs, and/or debit/credit payment machines (stable and/or portable).

Figure 5A:
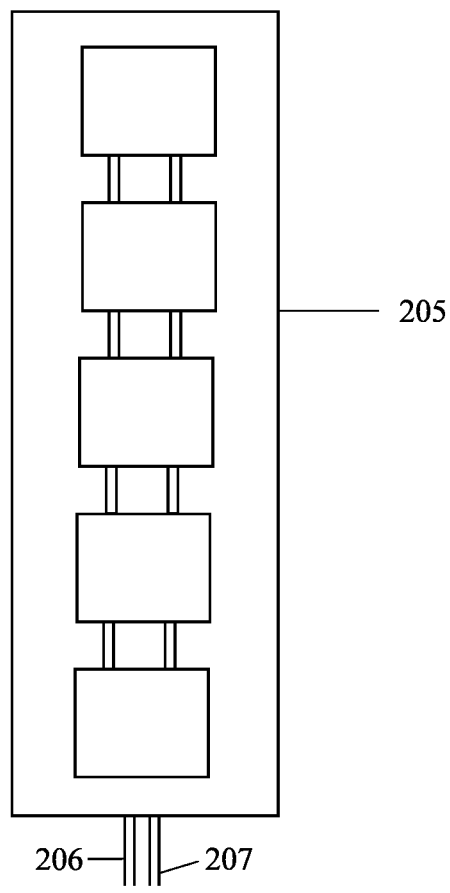
FIGS. 5A to 5C show a schematic diagram of a solar panel charged battery for the device illustrated in FIGS. 1 and 2, according to other embodiments.
Figure 5B:
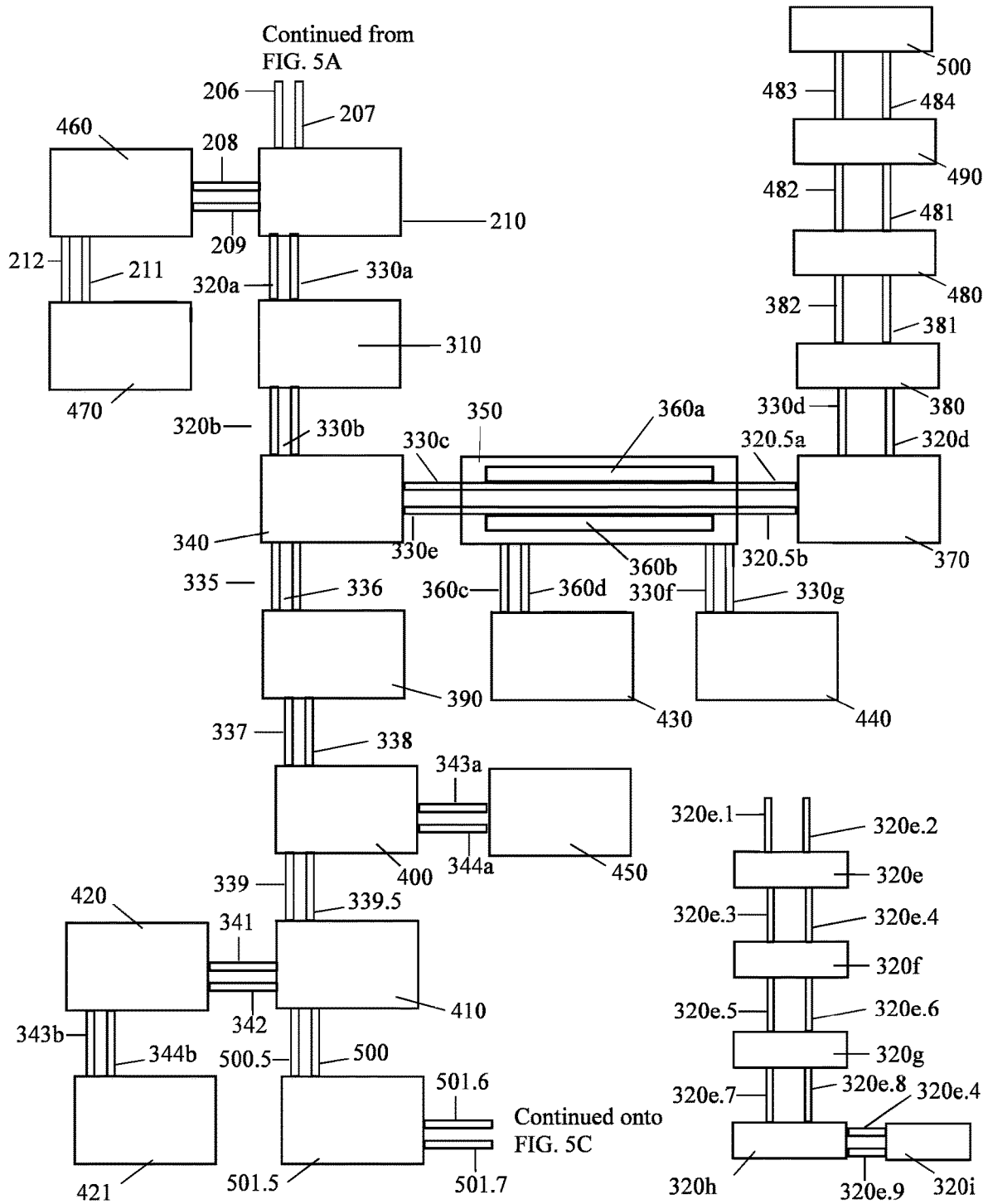
Figure 5C:
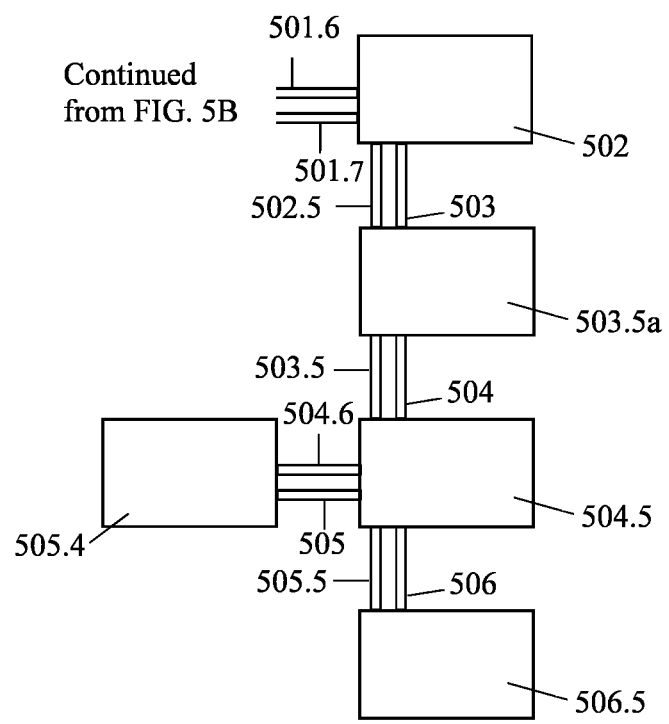

FIGS. 5A to 5C show a schematic diagram of a solar panel charged battery for the device illustrated in FIGS. 1 and 2, according to other embodiments.

Figure 6A:
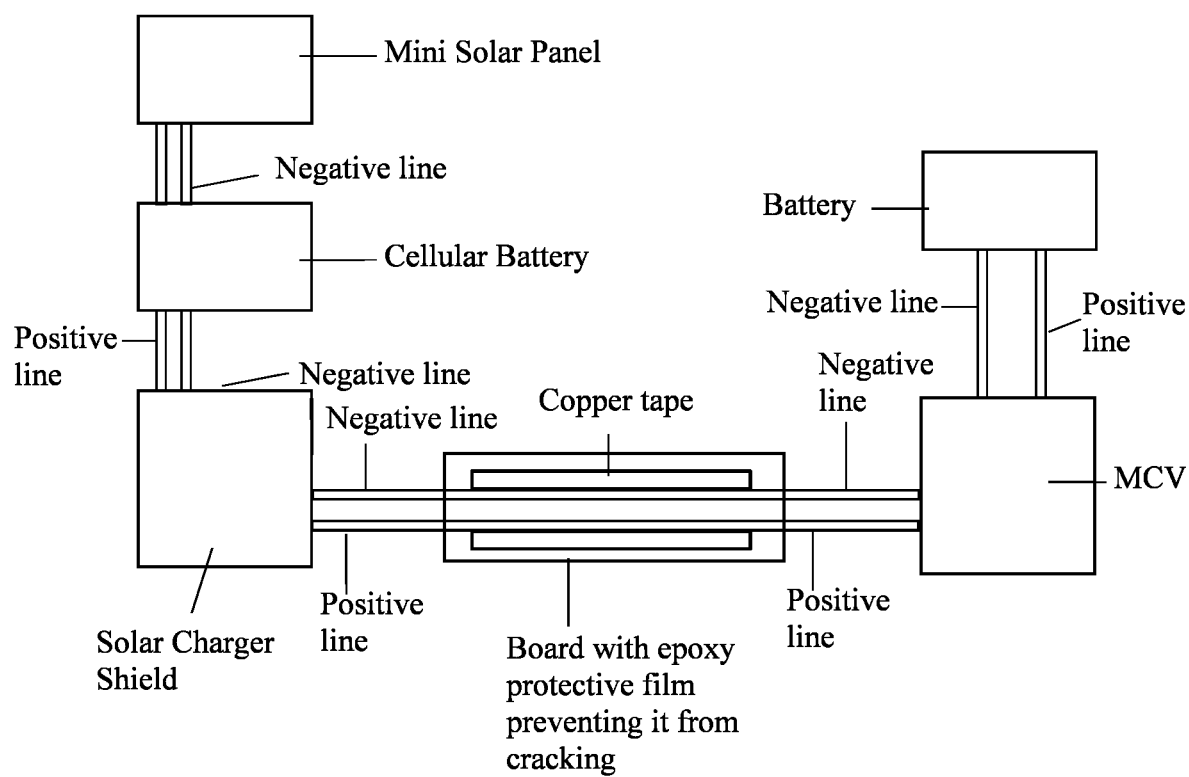
FIGS. 6A to 6Q show and describe additional embodiments of the device.
Figure 6B:
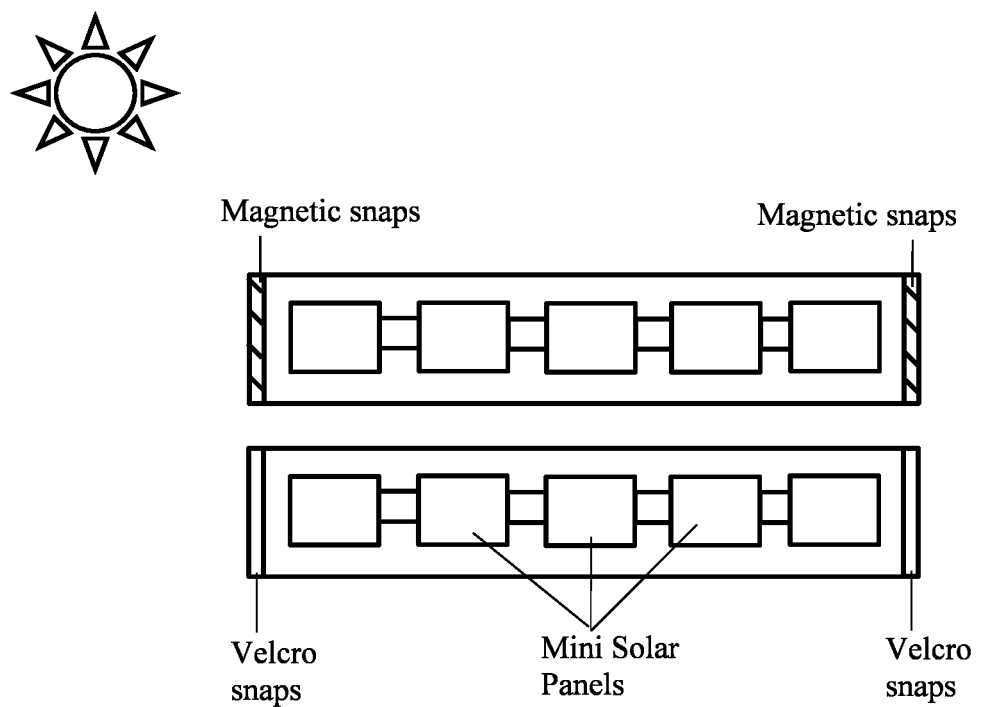
Figure 6C:
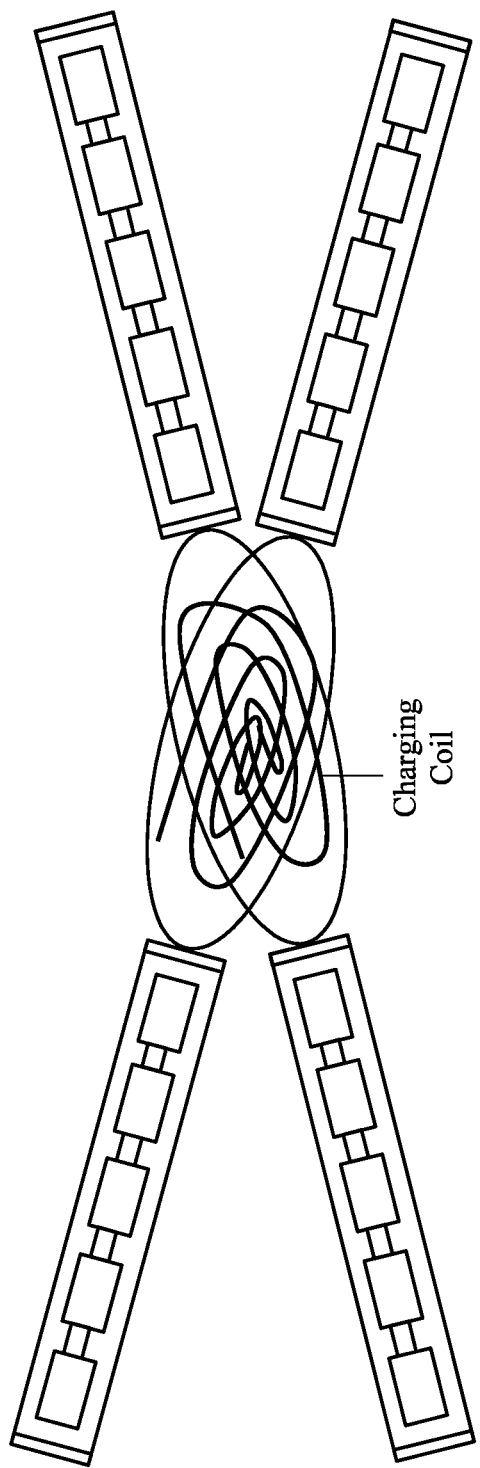
Figure 6D:
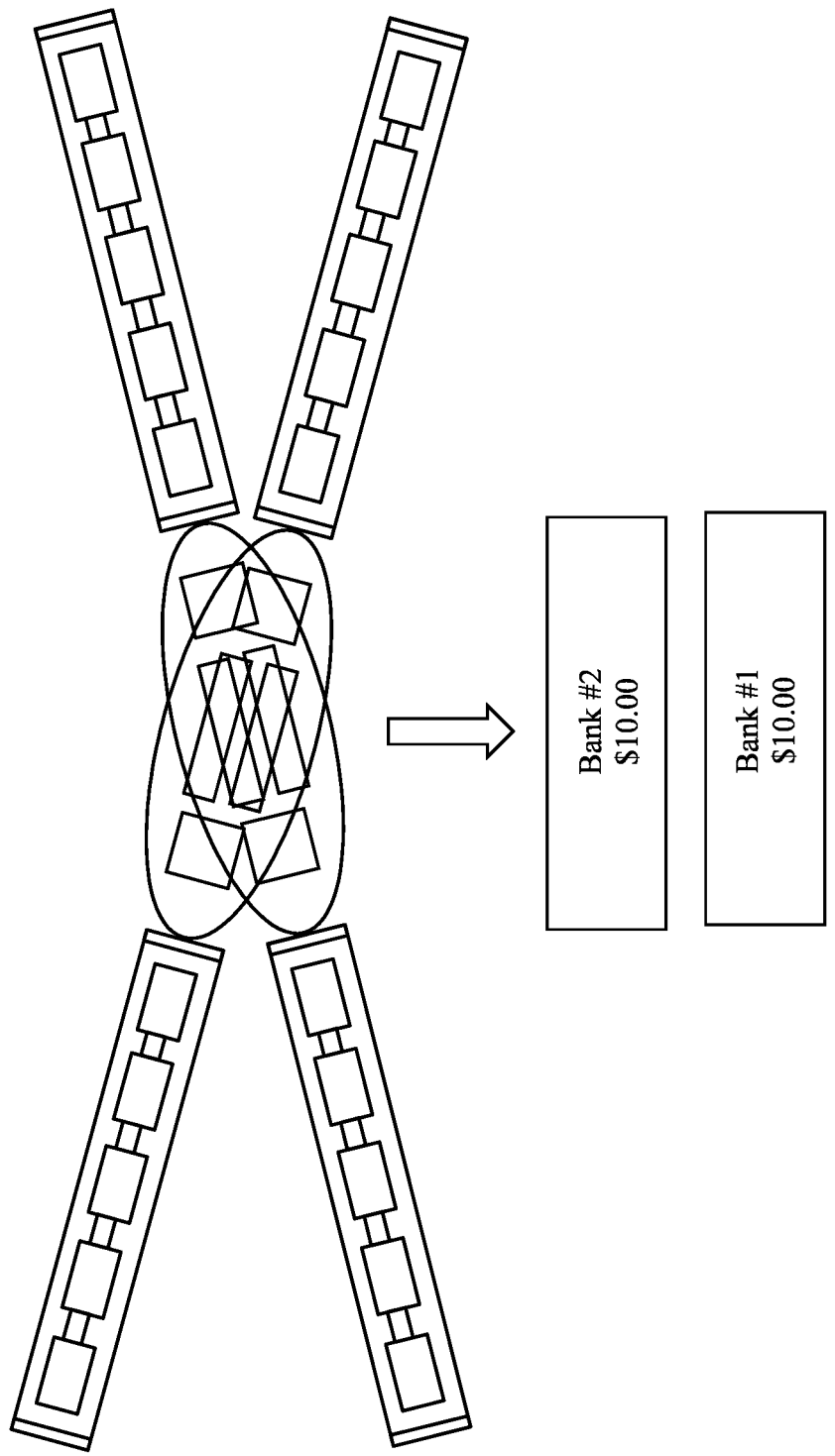
Figure 6E:
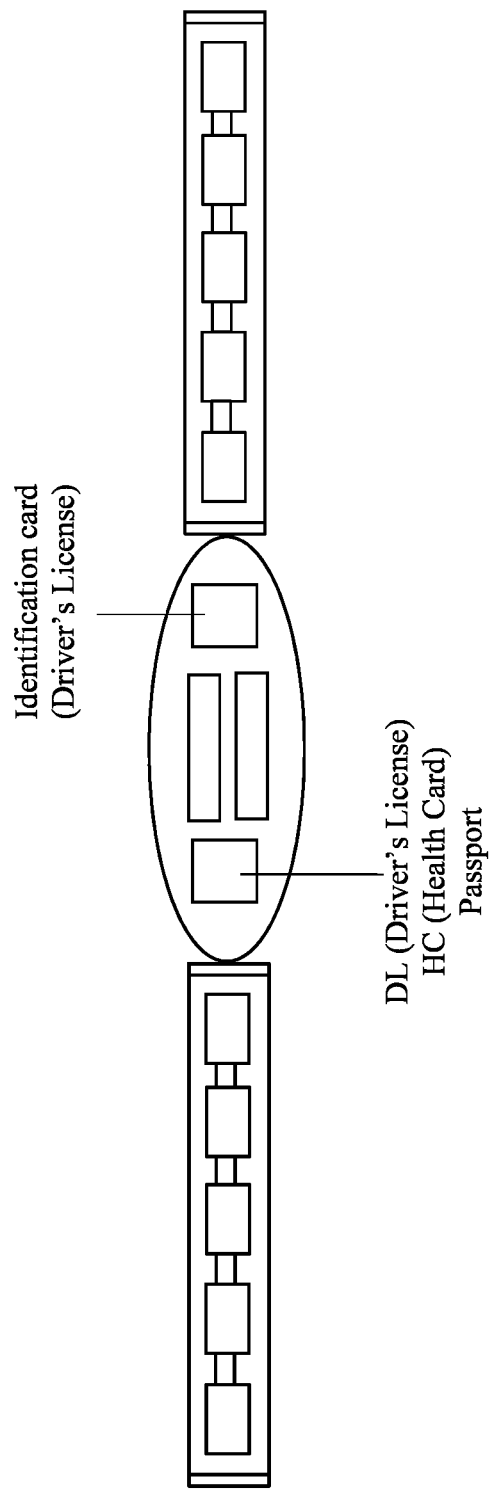
Figure 6F:
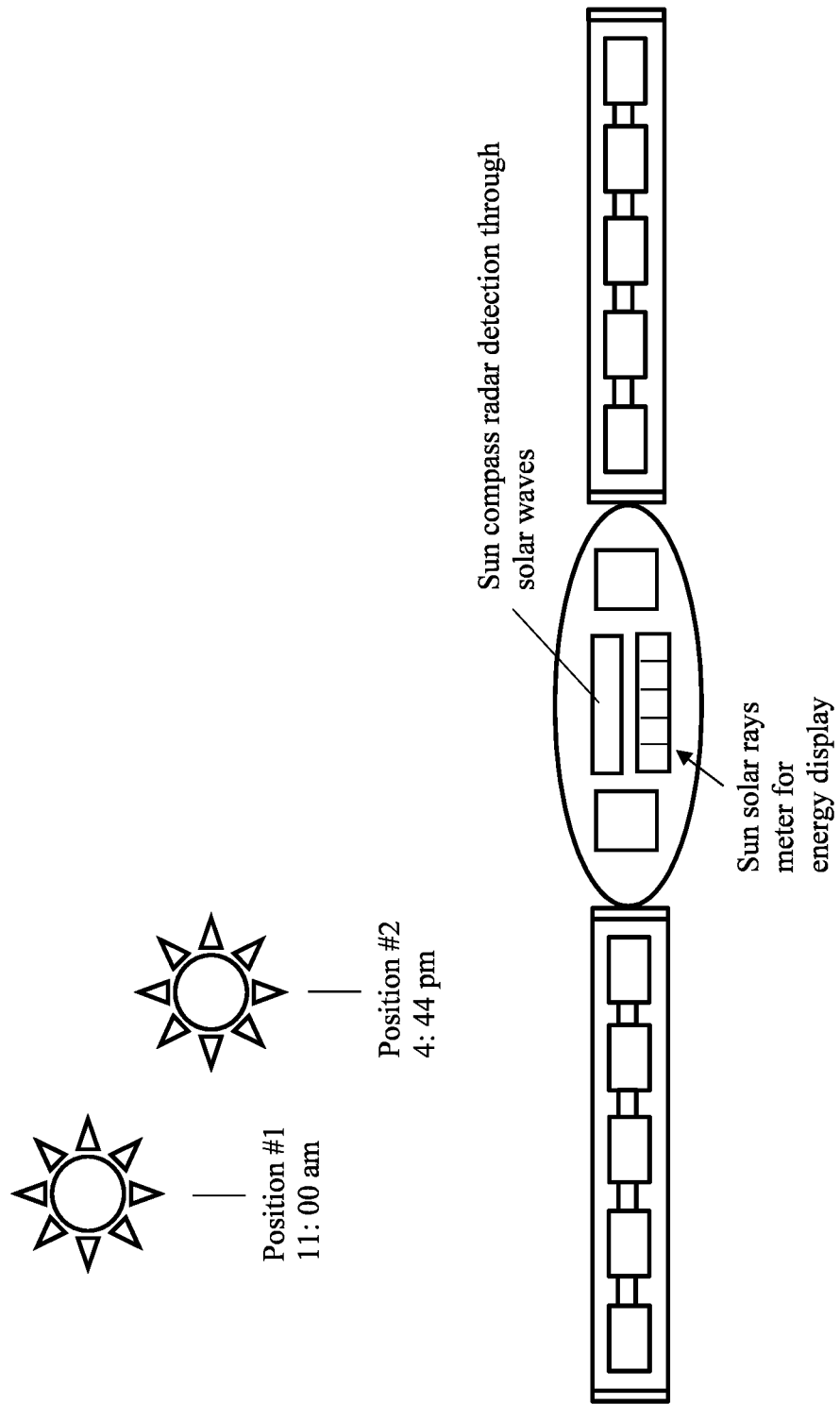
Figure 6G:
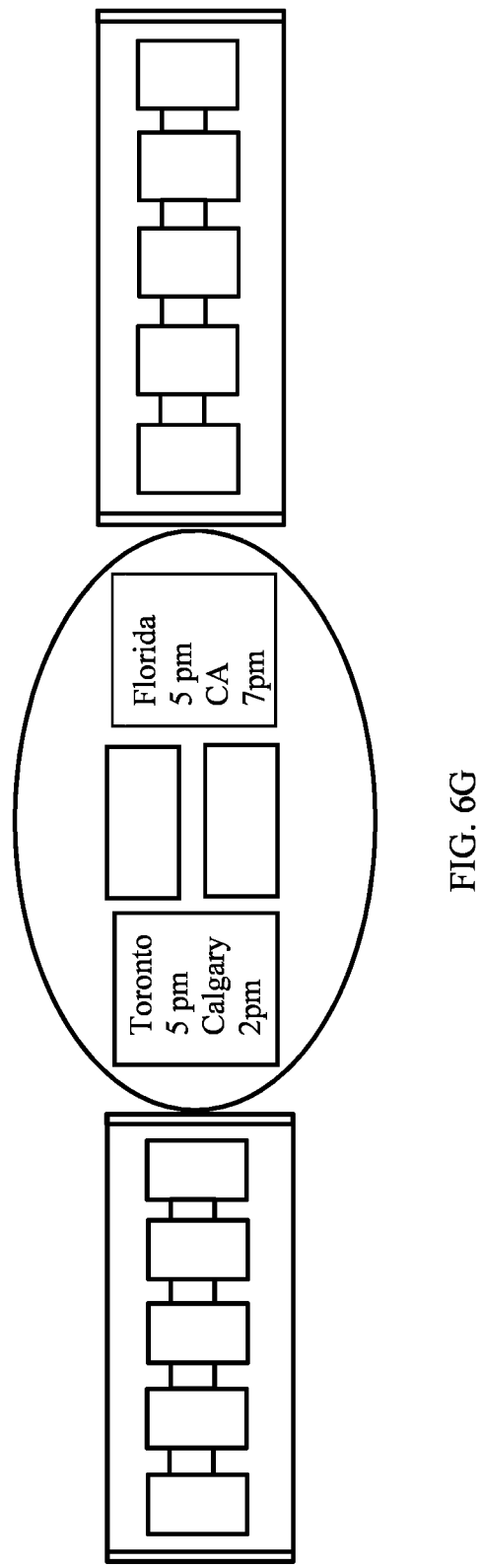
Figure 6H:
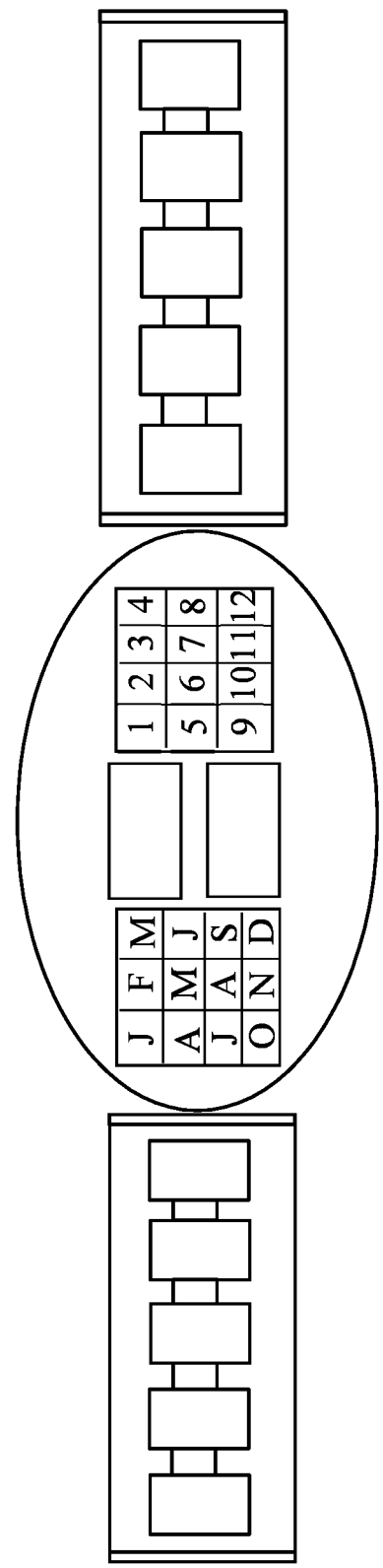
Figure 6I:
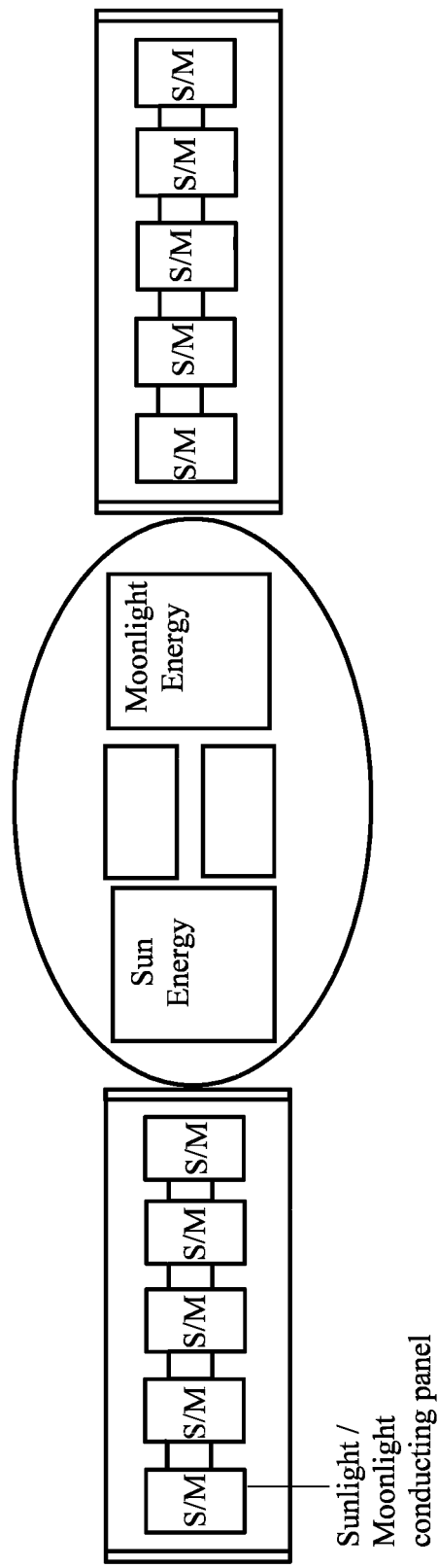
Figure 6J:
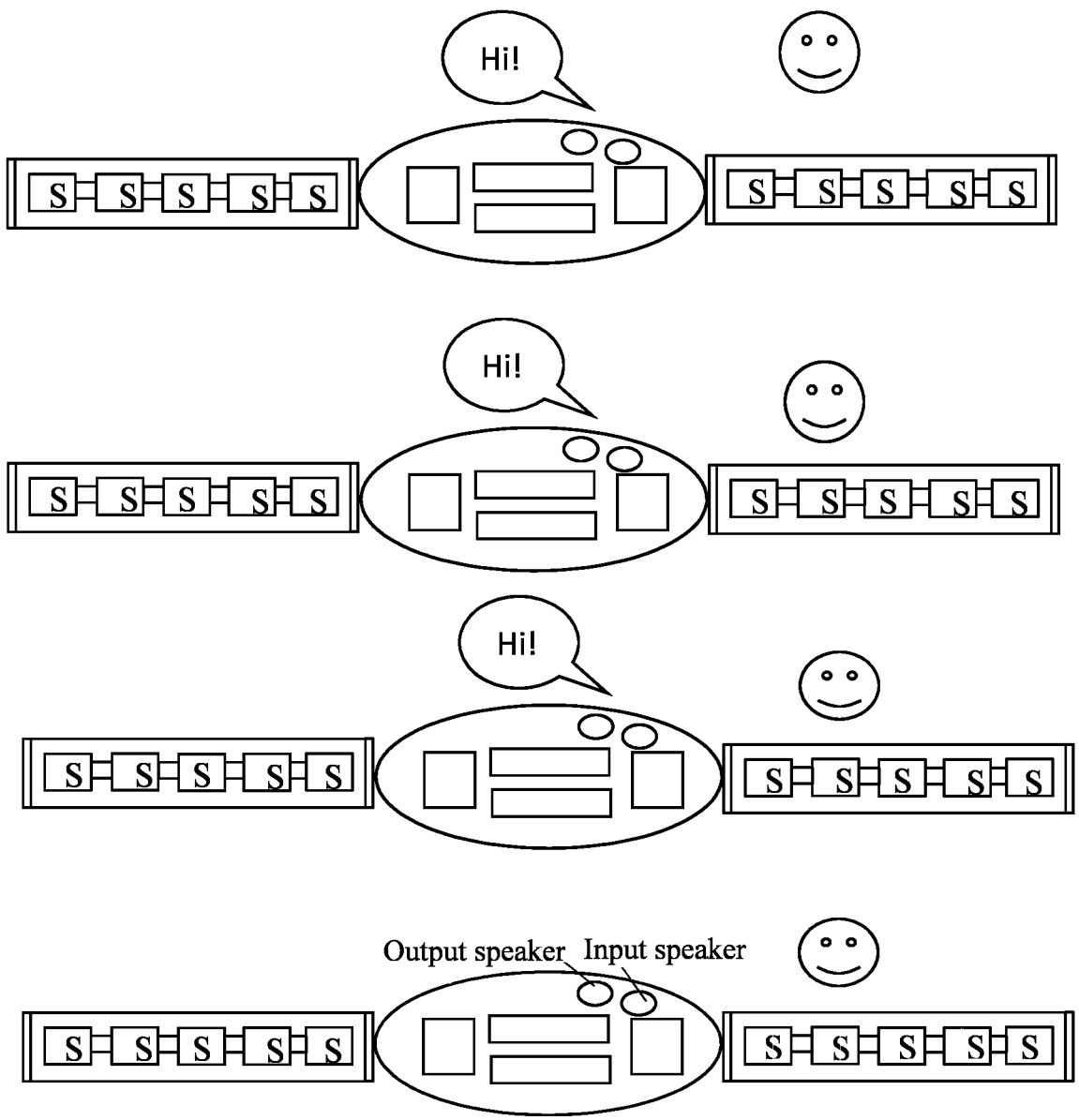
Figure 6K:
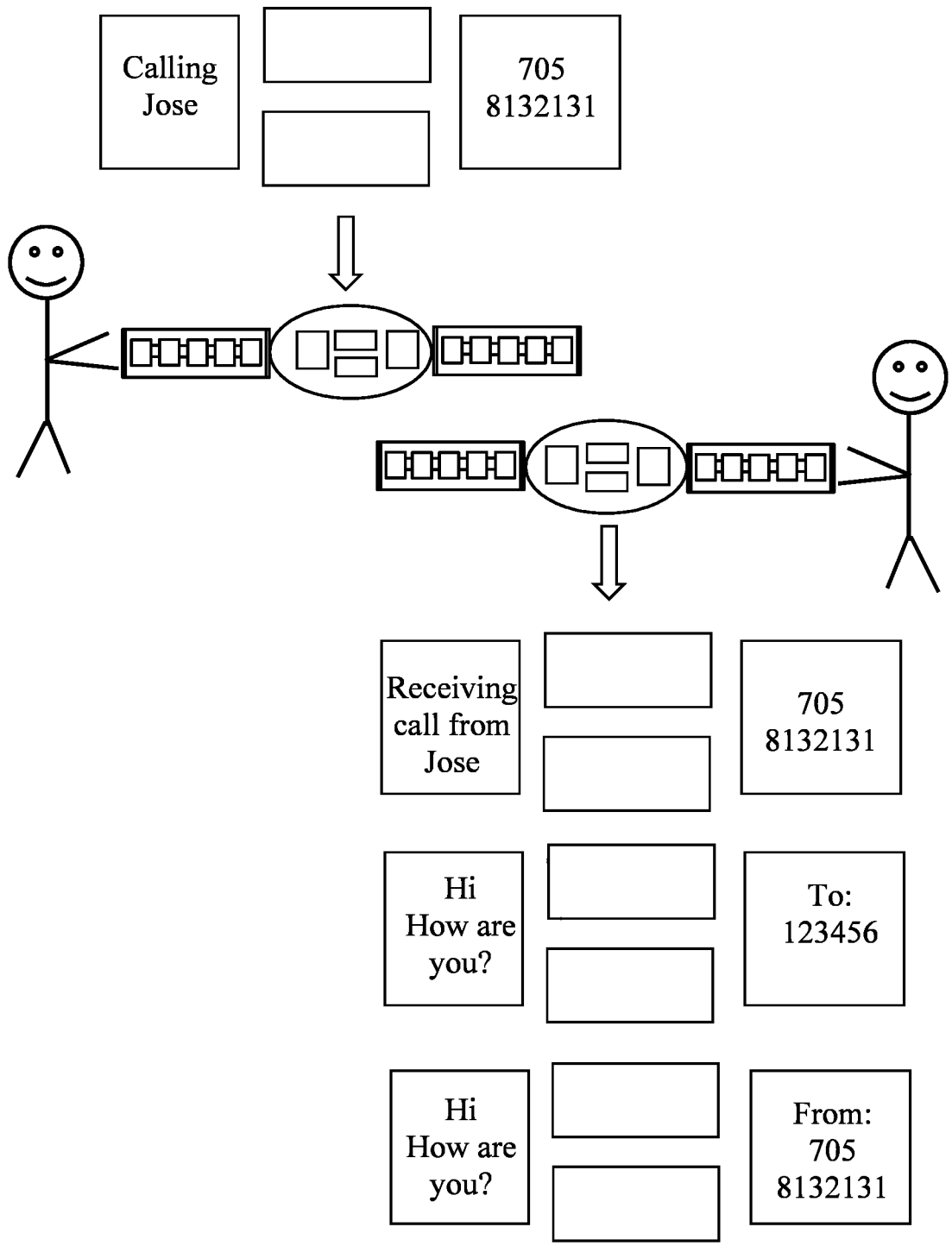
Figure 6M:
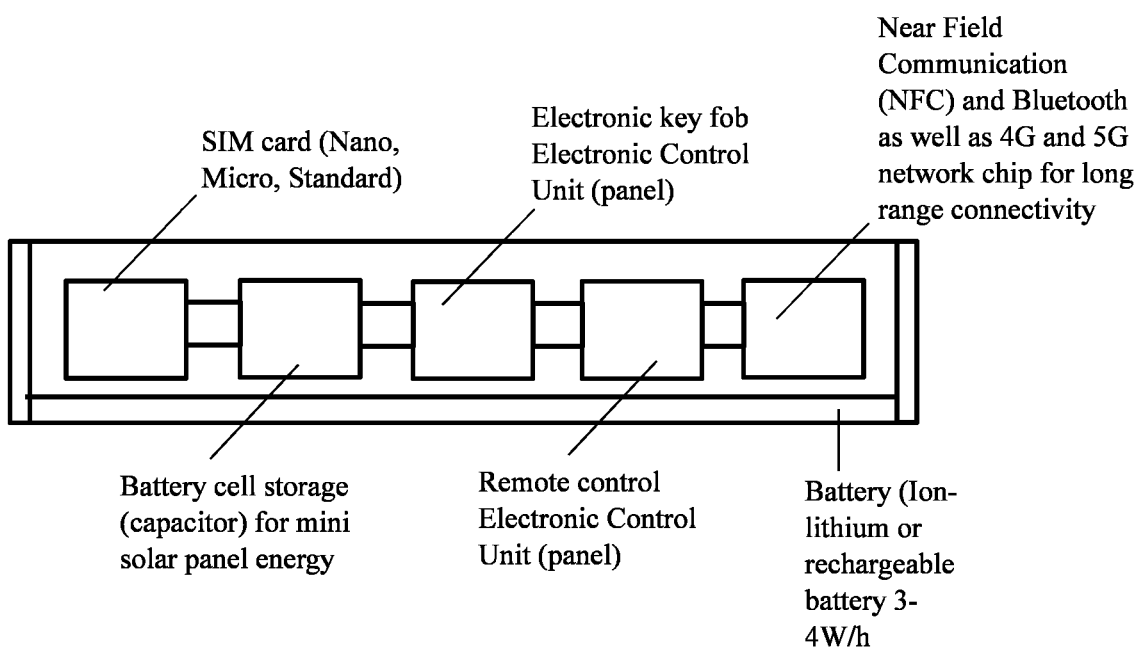
Figure 6N:
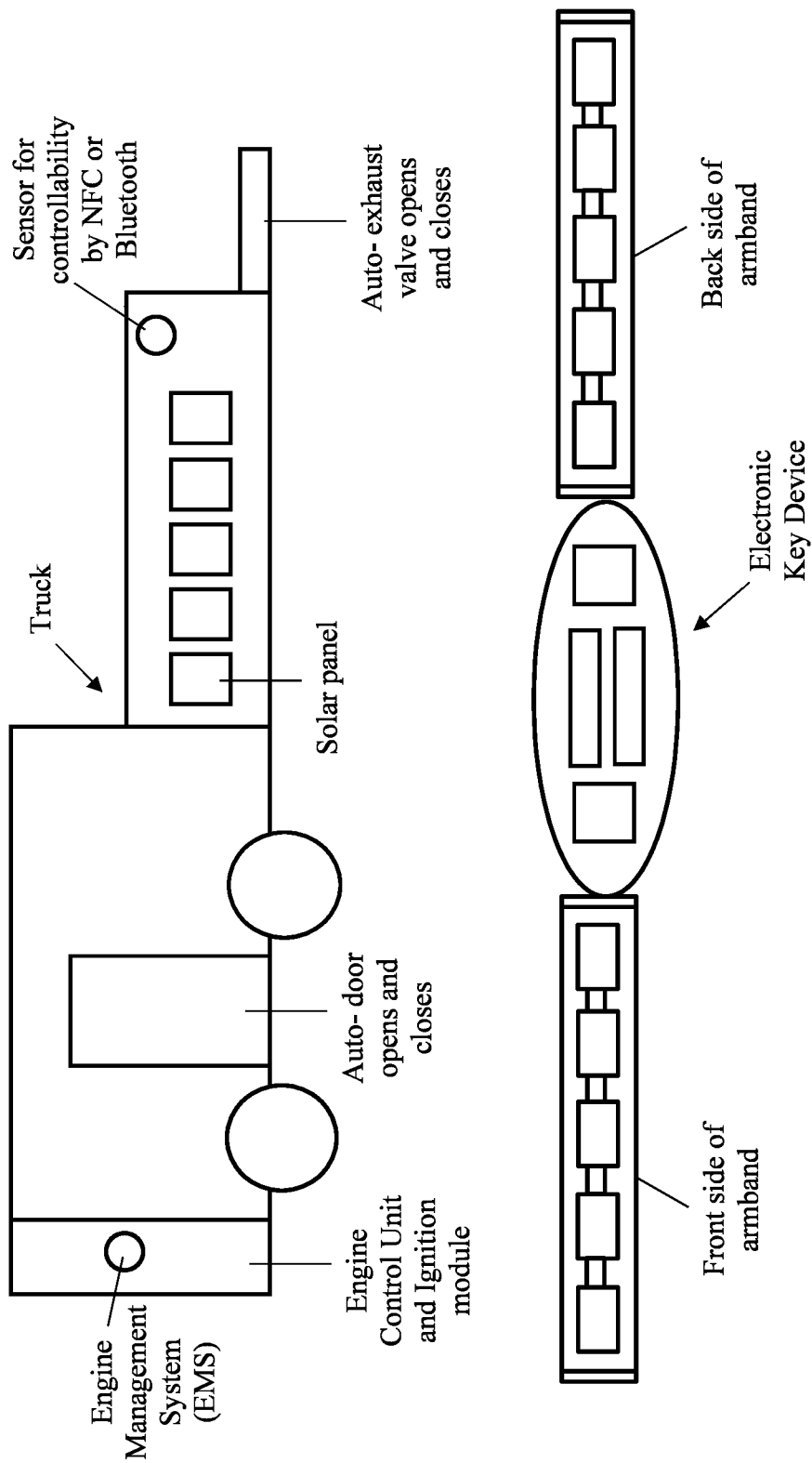
Figure 6O:
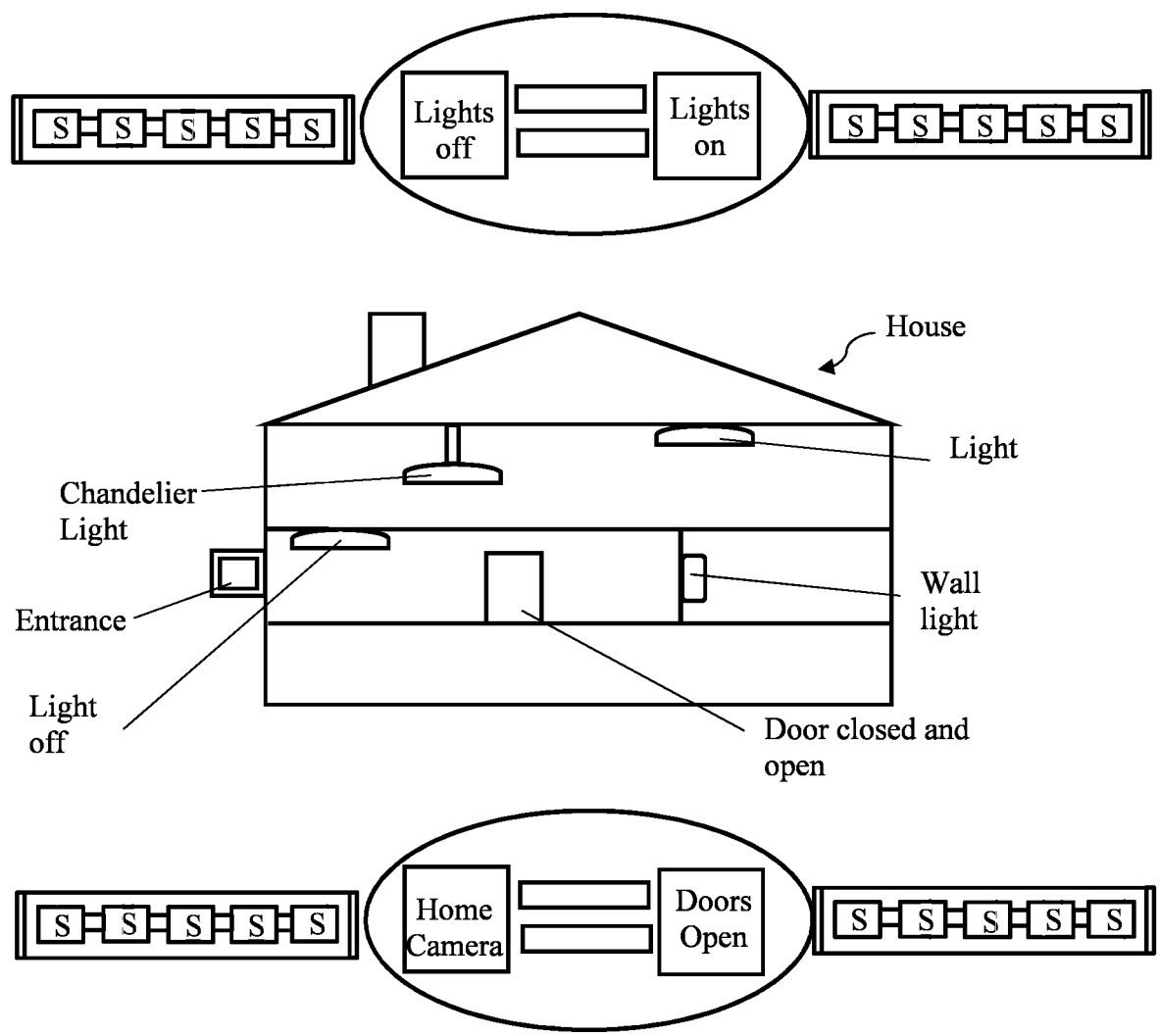
Figure 6P:
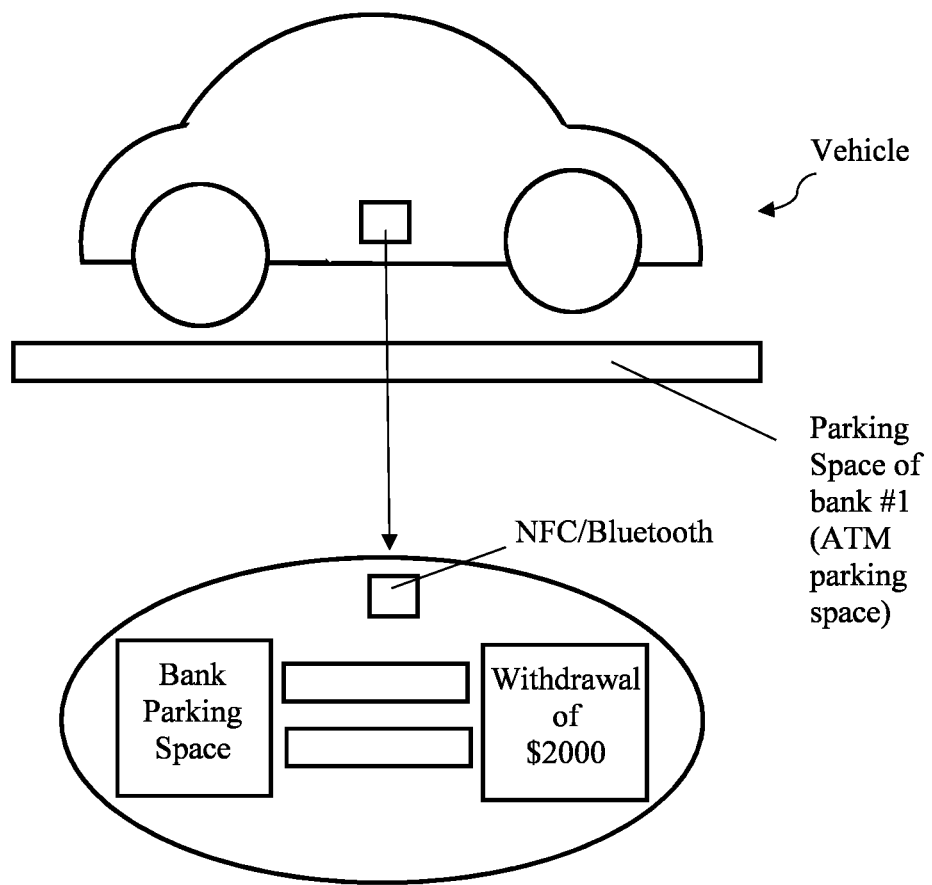
Figure 6Q:
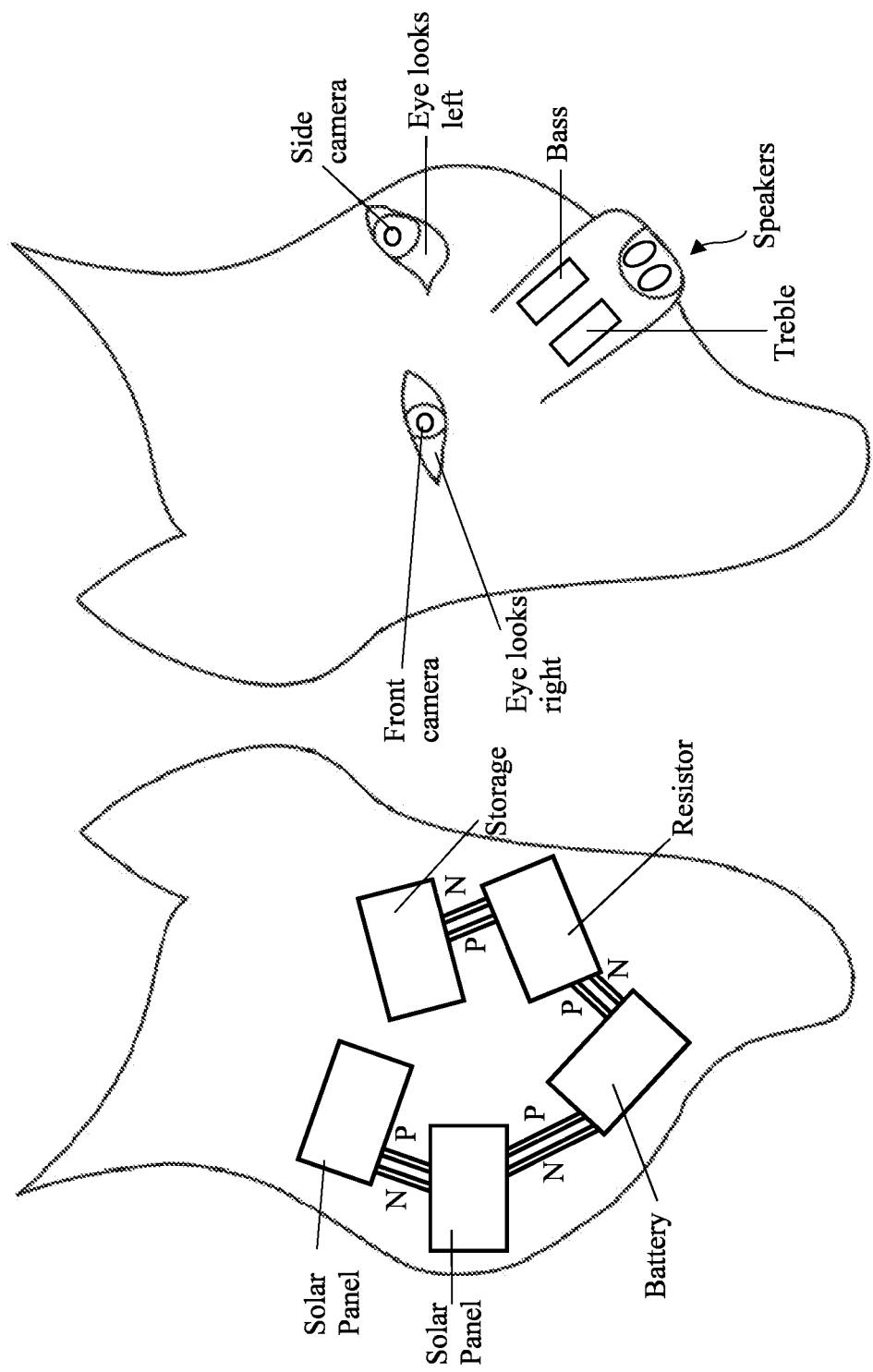

FIGS. 6A to 6Q show and describe additional embodiments of the device.

According to an embodiment shown in FIG. 5, there is a solar paneled armband 205; a power conductor (coil) 210; energy storage unit (capacitor #1) 310; music storage 320e; an alarm clock unit 320f; voice activator control unit 320g; Sound box (input and output) 320h; external speaker 320i; Lithium-Ion battery or Lithium Polymer battery 340; copper tape 360a,b; Near Field Communication (NFC) chip 370; Bluetooth communication chip 380; micro semiconductor 390; Intel computer chip generation computer processor 400; an electrical storage unit 410; battery cell storage capacitor 420; resistor 421; screen display backlight 430; flashlight component 440; electrical storage unit 450; power inverter 460; Electrical Ground Unit 470; 5G Network chip 480; Remote control unit (433 MHz wireless radio frequency switch direct current) 490; SIM card port (Nano, Micro or Standard size) 500; Europay, Mastercard and Visa (501.5); Radio Frequency Identification Chip (RFID) 502; Tiny Radio Transponder 503.4a; Radio receiver 504.5; and Radio Frequency Identification Antenna Ultra High Frequency 505.4.

According to an embodiment shown in FIG. 6A, there is a solar energy charging watch and electronic key device with the ability to charge its cellular battery using light energy absorbed by mini solar panels within the watch strap. The solar panels are regular panels, with thin film flexible, solar cloth, swat at 14% energy; 0.5 W at 17% 55×7 or 1 Wat 100% capacity, is chainable, waterproof, lightweight. The cellular battery is a Lithium-Polymer battery that is 3,000 MAH or 3 W/h; and 2V, 3 W, 3000 MAH. The MCV is a UWO bootloader, U2 a UART-to-USB converter, with a 3 onboard grove interface.

According to an embodiment shown in FIG. 6B, there is a solar energy charging watch and electronic key device strap with five photovoltaic cells, that is, five mini solar panels.

According to an embodiment shown in FIG. 6C, there is a solar energy charging watch and electronic key device that allows for peer-to-peer, device-to-device battery optimization via charging coils.

According to an embodiment shown in FIG. 6D, there is a solar energy charging watch and electronic key device that allows for peer-to-peer transactions using Near Field Communication (NFC) and Bluetooth technology when two watches are brought in close proximity. Parties are able to send and receive money. For example, $10.00 is being transacted from Bank #1 to Bank #2, after which, Bank #1 has $0.00.

According to an embodiment shown in FIG. 6E, there is a solar energy charging watch and electronic key device which may store identification information.

According to an embodiment shown in FIG. 6F, there is a solar energy charging watch and electronic key device comprising of a sunlight positioning system.

According to an embodiment shown in FIG. 6G, there is a solar energy charging watch and electronic key device which may display time zones from around the world.

According to an embodiment shown in FIG. 6H, there is a solar energy charging watch and electronic key device having a calendar display function.

According to an embodiment shown in FIG. 6I, there is a solar energy charging watch and electronic key device with a watch strap comprising of sunlight and moonlight conducting panels.

According to an embodiment shown in FIG. 6I, there is a solar energy charging watch and electronic key device that functions as a personal family communication device via voice using cellular data or Wi-Fi.

According to an embodiment shown in FIG. 6K, there is a solar energy charging watch and electronic key device that is able to send and receive text messages and be used for cellular communication calls.

According to an embodiment shown in FIG. 6L, there is a solar energy charging watch and electronic key device that may be turned on and off using voice command.

According to an embodiment shown in FIG. 6M, there is a solar energy charging watch and electronic key device that is activated by voice control in order to open and close vehicle doors. There is data transmission between the key device and the sensors on the vehicle. The watch and key device also provide driving assistance (including speed and RPM control), starts the ignition and provides remote control drive functionality. Further, the key device controls energy flow from solar panels to capacitor.

According to an embodiment shown in FIG. 6N and 6O, there is a solar energy charging watch and electronic key device that may be used to control home power systems and home security systems using NFC or Bluetooth technology.

According to an embodiment shown in FIG. 6P, there is a solar energy charging watch and electronic key device that facilitates vehicle banking and payments infusion using Europay, Mastercard and/or Visa payment methods.

According to an embodiment shown in FIG. 6Q, there is a solar energy charging electronic key device shaped like a Wolf head, of which, the front side of the Wolf Head has dimensions of 130 mm×130 mm and the back side of the Wolf Head has dimensions of 130 mm×130 mm.

According to an embodiment, the solar panels absorb sunlight energy to generate electricity through photovoltaic cells, after which, the energy is transferred to a semiconductor creating the electric field to deliver voltage plus current, which is measured in wattage (watts) (W).

According to an embodiment, electric charge Q (mAh)=Energy (W/h)/Volts (V)×Multiplier (1000).

According to an embodiment, Near Field Communications (NFC) can also write business cards, produce media file connections such as sending waves to another device to either preview music, Microsoft office documents (i.e., Word, Excel, PowerPoint), videos (4K, 1080p, 720p, 540p, 360p, 180p definition) as well in photos and high-definition MIll, CT and X-rays. Tags can also send contact information. NFC can assist us in pairing connectivity for future electronics and door lock/unlock capabilities, for exceptionally quick results. NFC will assist in our card emulation process (i.e., securing the card intelligence in the desired transaction), not to store or handle the cards number. However, through certificates and legal assistance, a bank card could issue such grant. We will develop a merchant payment terminal that is NFC capable. Other areas of usage consists of: train tickets, boarding passes, hotel in room amenities purchases, climate control, convenience stores, links and information shareables, rewards and loyalty programs, auto electronic receipts, employee tax forms; other and all documents as well as NFC employee pay stubs; electronic accessibility, auto online direct NFC pay by touching your screen, library cards, access cards, passports, identification cards, drones, e-books, marketing and advertisement integration, parliament operations, all forms of life access and life support mechanisms, parking meters, park passes, all reservation types, gas station pumps (contactless), movies and movie theatres, public facilities, cordless coupons, product shelves for product price and information, allergy scanning and pandemic infection scanning, song downloads, dispensaries, beach retail, food and beverages on-the-go trucks, trucking association tracking and monitoring of vehicle/driver health, NFC tap to provide your identity at bards, clubs, restaurants, lounges, business networking events, video games, laundry (clothes washing) connectivity, lighting control.

Various embodiments of the invention have been described in detail. Since changes in and or additions to the above-described best mode may be made without departing from the nature, spirit, or scope of the invention, the invention is not to be limited to those details but only by the appended claims.

The invention claimed is:

1. A solar energy charging watch and electronic key device and operating system thereof comprising:
    a body comprising:
        a watch face in the shape of an animal face with a rounded raised nose;
        four digital touchscreen displays on the watch face, the four digital touchscreen displays being arranged across four sides of the rounded raised nose;
        at least one camera on the watch face;
        a rechargeable battery; and
        at least one of a Bluetooth chip, a Near Field Communication (NFC) chip,
        a radio frequency identification (RFID) tag;
    a strap made of a flexible material and including a series of at least five photovoltaic cells positioned along a length of the strap and interconnected, the series of at least five photovoltaic cells being configured to power the rechargeable battery;
    a capacitator configured to store energy from the series of at least five photovoltaic cells; and
    means for transferring energy from the series of at least five photovoltaic cells to the rechargeable battery.

2. The solar energy charging watch and electronic key device and operating system thereof according to claim 1, wherein the at least one camera comprises two cameras.

3. The solar energy charging watch and electronic key device and operating system thereof according to claim 2, wherein one of the two cameras comprises a wide-angle lens.

4. The solar energy charging watch and electronic key device and operating system thereof according to claim 1, wherein the body further comprises a payment processing chip.

5. The solar energy charging watch and electronic key device and operating system thereof according to claim 1, further comprising a flashlight unit.

6. The solar energy charging watch and electronic key device and operating system thereof according to claim 1, further comprising a microphone and voice processing means for receiving voice commands.

7. The solar energy charging watch and electronic key device and operating system thereof according to claim 1, wherein the body further comprises a SIM card port for at least one of nano, micro, and standard sized SIM cards.

8. The solar energy charging watch and electronic key device and operating system thereof according to claim 1, wherein the means for transferring energy from the series of at least five photovoltaic cells to the rechargeable battery comprises a transistor.

* * * * *